(12) United States Patent
Zaman et al.

(10) Patent No.: US 6,751,678 B1
(45) Date of Patent: Jun. 15, 2004

(54) METHOD AND SYSTEM FOR EXPANDING THE I/O ON I/O LIMITED DEVICES

(75) Inventors: Sabih Qamaruz Zaman, Waukesha, WI (US); Manfred David Boehm, Waukesha, WI (US)

(73) Assignee: GE Medical System Global Technology, LLC, Waukesha, WI (US)

( * ) Notice: Subject to any disclaimer, the term of this patent is extended or adjusted under 35 U.S.C. 154(b) by 0 days.

(21) Appl. No.: 10/065,982

(22) Filed: Dec. 6, 2002

(51) Int. Cl.[7] .................................................. G06F 3/00
(52) U.S. Cl. ............................ 710/2; 710/15; 710/33; 710/52
(58) Field of Search .............................. 710/15, 52, 53, 710/54, 2, 33

(56) References Cited

U.S. PATENT DOCUMENTS

| | | | |
|---|---|---|---|
| 4,060,849 A | 11/1977 | Bienvenu et al. | 360/200 |
| 5,261,049 A | * 11/1993 | Lumelsky et al. | 345/519 |
| 5,895,978 A | * 4/1999 | Palagonia | 257/786 |
| 6,492,726 B1 | * 12/2002 | Quek et al. | 257/723 |

* cited by examiner

Primary Examiner—Jeffrey Gaffin
Assistant Examiner—Alan Chen
(74) Attorney, Agent, or Firm—Peter J. Vogel

(57) ABSTRACT

An I/O system includes a Digital Device selecting a digital output to be set and a Digital I/O Expansion Mechanism, electrically coupled to the Digital Device. The Digital I/O Expansion Mechanism includes an input bank, a FIFO, and an I/O line. The Digital I/O Expansion Mechanism clears a stored value in the first input bank, samples the first value of the first input bank, and detects a change in the input bank. The Digital I/O Expansion Mechanism also stores a state of a data bit of the input bank along with a bank identifier in the FIFO. The Digital I/O Expansion Mechanism still further samples the I/O line via a first READ cycle and drives the I/O line with a next data entry from the FIFO. Digital I/O Expansion Mechanism samples all digital inputs and stores any detected changes in the FIFO. The Digital I/O Expansion Mechanism transmits all values in the FIFO to the Digital Device during a subsequent READ cycle and transmits to the Digital Device a last value read. The Digital I/O Expansion Mechanism also changes a digital output when a first WRITE command occurs and the Digital Device explicitly selects the digital output to be set and writes an entire bank in response to a bit change. Additionally, the Digital I/O Expansion Mechanism decodes and latches the digital output until the digital output is overwritten via a second WRITE command to the input bank from the Digital Device.

17 Claims, 4 Drawing Sheets

METHOD AND SYSTEM FOR EXPANDING THE I/O ON I/O LIMITED DEVICES

BACKGROUND OF INVENTION

The present invention relates generally to circuit design, and more particularly, to electric-based designs with distributed input/output modules.

In a system including a distributed control arrangement, a serial communication device is typically used to interface to the remote I/O (Input/Output) modules or nodes. These I/O modules are often based on readily available standard products from a number of different companies, as is well known. A problem is often encountered, however, when the number of required Digital Inputs and/or Digital Outputs exceeds the number of available I/O in a standard device. This necessitates inundating a module with multiple I/O devices, specifying a more expensive high I/O count device, or designing a custom circuit. When the required rate of change of inputs in such a module is low compared to the rate at which the data can be transmitted to the consumer of the digital input data, a method for expanding the Digital I/O capabilities for such a standard device is required.

A standard Digital I/O device has a limited number of I/O lines, it may also generate READ and WRITE control lines in conjunction with a bi-directional data bus to interface with external write latches and READ buffers. One common method for I/O data transfer is to add more I/O modules. Such a solution, however, is very costly.

The disadvantages associated with current I/O systems have made it apparent that a new technique for expanding the I/O on I/O limited devices is needed. The new technique should substantially provide a low cost solution while maintaining efficient data transfer. The present invention is directed to these ends.

SUMMARY OF INVENTION

In accordance with one aspect of the invention, an I/O system includes a Digital Device used in an application where multiple digital I/O are needed. The system further includes a Digital I/O Expansion Mechanism, electrically coupled to the Digital Device, including a first input bank, a FIFO, and an I/O line. The Digital I/O Expansion Mechanism is adapted to sample a first value of an initialized first input bank and detect a change in the input bank. The Digital I/O Expansion Mechanism is further adapted to store the state of a data bit of the input bank and a bank identifier in the FIFO, sample thus the data bit via a first READ cycle, drive the digital device a next data entry from the FIFO, and sample substantially all digital inputs. The Digital I/O Expansion Mechanism is adapted to store any detected changes in the FIFO and transmit all values in the FIFO to the Digital Device during subsequent READ cycles. The Digital I/O Expansion Mechanism is adapted to transmit a last value read to the Digital Device, change a digital output when a first WRITE command occurs and the Digital Device explicitly selects the digital output to be set, and write an entire bank in response to a bit change. The Digital I/O Expansion Mechanism is then adapted to decode and latch the digital output until the digital output is overwritten via a second WRITE command to the output bank from the Digital Device.

In accordance with another aspect of the invention, a method for I/O data transfer includes sampling a first value of a first initialized input bank. When a change is detected, the FIFO stores a state of a data bit of the input bank and a bank identifier. An expansion mechanism I/O line is sampled via a first READ cycle, and the I/O line is driven with a changed data entry from the FIFO. Substantially all digital inputs are sampled and the FIFO stores any detected changes. All values in the FIFO are transmitted to a Digital Device during a second READ cycle, and a last value read is also transmitted to the Digital Device. A digital output is changed when a first WRITE command occurs and the Digital Device explicitly selects the digital output to be set. An entire bank is written in response to a bit change. The expansion mechanism digital output is then decoded and latched until the expansion mechanism digital output is overwritten via a subsequent WRITE command to the input bank from the Digital Device.

The advantages of this application are that all the sub-system digital inputs and outputs can be consolidated to one Digital Device for efficient and cost effective performance. The method of expanding of a finite number of digital I/O lines eliminates the need to require multiple Digital I/O devices.

Other objects and advantages of the present invention will become apparent upon the following detailed description and appended claims, and upon reference to the accompanying drawings.

DETAILED DESCRIPTION

The present invention is illustrated with respect to an I/O system, particularly suited to the medical field. The present invention is, however, applicable to various other uses that may require I/O data transfer, as will be understood by one skilled in the art.

Figure 1:
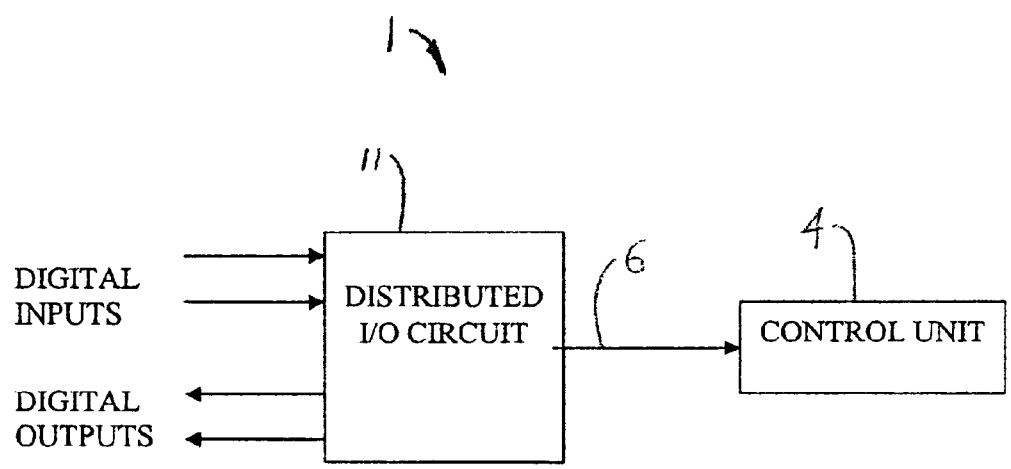
FIG. 1 is a distributed control arrangement system 1 wherein the present invention may be used to advantage.

Referring to FIG. 1, a distributed control arrangement system 1 includes remote I/O (Input/Output) lines interfaced with a serial communication device or distributed I/O circuit 11, which is electrically coupled to a control unit 4 through a communication bus 6, as will be understood by one skilled in the art. The present invention is implemented as part of the distributed I/O circuit 11. Important to note is that the present invention includes embodiments having multiple implementations of the system 1 for expanding the I/O on I/O limited devices in, for example, a network connected by a communication bus.

Figure 2:
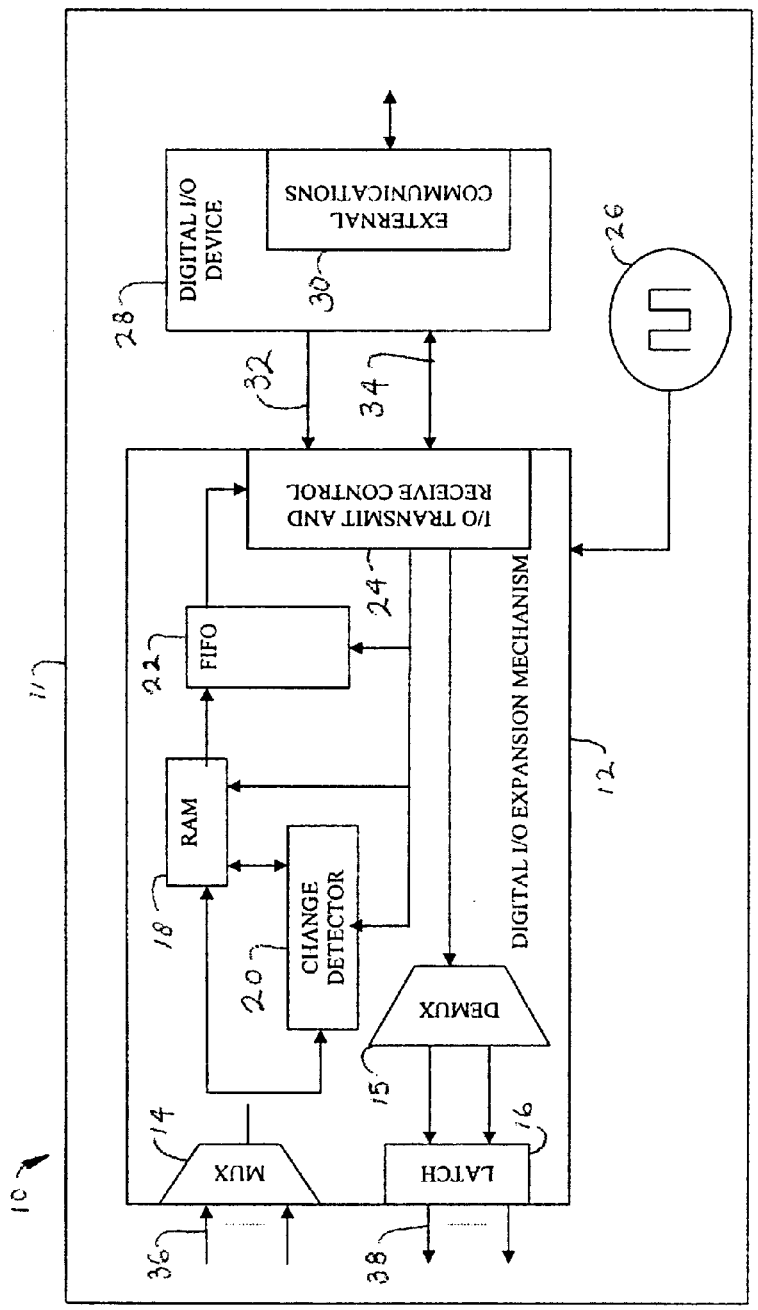
FIG. 2 is a block diagram of an I/O system in accordance with another embodiment of the present invention.

Referring to FIG. 2, an I/O system 10 includes a distributed I/O circuit 11 including a Digital I/O Expansion Mechanism 12, a clock 26 and a Digital I/O Device 28 (Digital Device). The system 10 is alternately embodied as including numerous variations and combinations to the disclosed invention that one skilled in the art would realize.

The Digital I/O Expansion Mechanism 12 includes at least one of each of a multiplexer 14, a demultiplexer 15, a latch 16, a memory device (e.g. a Random Access Memory 18), a change detector 20, a First In First Out (FIFO 22), and an I/O Transmit and Receive Control 24. The Digital I/O Expansion Mechanism 12 is synchronized through the clock 26, which is coupled thereto.

The multiplexer 15 is electrically coupled to the Random Access Memory 18 (RAM). and the change detector 20, which are in turn electrically coupled to each other. The RAM 18 is also electrically coupled to the FIFO 22, which is electrically coupled to the I/O Transmit and Receive Control 24. The I/O Transmit and Receive Control 24 is electrically coupled to the Digital I/O Device 28, the demultiplexer 15, the change detector 20, the RAM 18 and the FIFO 22.

The multiplexer 14 controls the transfer of data from a set of input busses 36 (multiplexer digital inputs from remote modules). The multiplexer 14 is embodied as a single component, however alternate embodiments include numerous components adapted to handle numerous sets of input busses.

The RAM 18, or an alternate memory device used in place of the RAM 18, receives multiplexer signals and I/O Transmit and Receive Control signals and exchanges data with the change detector 20. The RAM 18 stores external signal data and can be read from and written into during normal system operation. The RAM 18 includes a first input bank and various other input banks as the system 10 requires. The RAM 18 resets and thereby clears a stored first value within the first input bank.

The FIFO 22 receives RAM data signals and I/O Transmit and Receive Control signals and generates therefrom output signals. The FIFO 22 is a well known component in the art, which stores a series of data points and outputs the first inputted data point first.

The I/O Transmit and Receive Control 24 receives the FIFO signals, control line signals and Data I/O Line signals from the Digital I/O Device 28 and generates therefrom control signals, which are received by the change detector 20, the RAM 18, the FIFO 22, the demultiplexer 15 and the Digital I/O Device 28 through the Data I/O Lines 34.

The change detector 20 receives the signals from the I/O Transmit and Receive Control 24, the RAM 18, and the multiplexer 14 and generates therefrom change signals. The change detector 20 is embodied as a typical change detector, which will be understood by one skilled in the art. The change detector detects a change between a first time and-a second time and flags the aforementioned change, thereby generating the change signal.

The demultiplexer 15 routes data from the I/O transmit and Receive Control signal to a plurality of Latch outputs. The multiplexer 14 is embodied as a single component, however alternate embodiments include numerous components adapted to handle numerous sets of input busses.

The Latch 16 generates the demultiplexed digital outputs in response to the demultiplexer signals, as will be understood by one skilled in the art.

The clock 26 synchronizes the components of the Digital I/O Expansion Mechanism 12, as will be understood by one skilled in the art. Alternate embodiments, however, are asynchronous and do not include the clock 26.

The Digital I/O Device 28 includes an external communications I/O device 30 (for communicating with a system control device) and control lines 32 and Data I/O Lines 34 electrically coupled to the I/O Transmit and Receive Control 24. The Digital I/O Expansion Mechanism, Digital I/O Device and clock are all included in the distributed I/O circuit 11. In the preferred embodiment of this invention, the Digital I/O Device 28 generates control signals to indicate valid READ and WRITE cycles on the bi-directional data lines (Data I/O Lines 34). In another embodiment of the design, the Digital I/O Device 28 includes separate input and output lines. The timing of the data transmission at the input lines, however, is managed by the Digital I/O Expansion Mechanism 12 such that Multiplexed Digital Input (MDI) data is driven at less than half the sampling data rate of the Digital I/O device 28. De-Multiplexed Digital Outputs (DDOs) are updated by the Digital I/O Expansion Mechanism when a change is detected on the Digital I/O Device output data lines 34.

Figure 3:
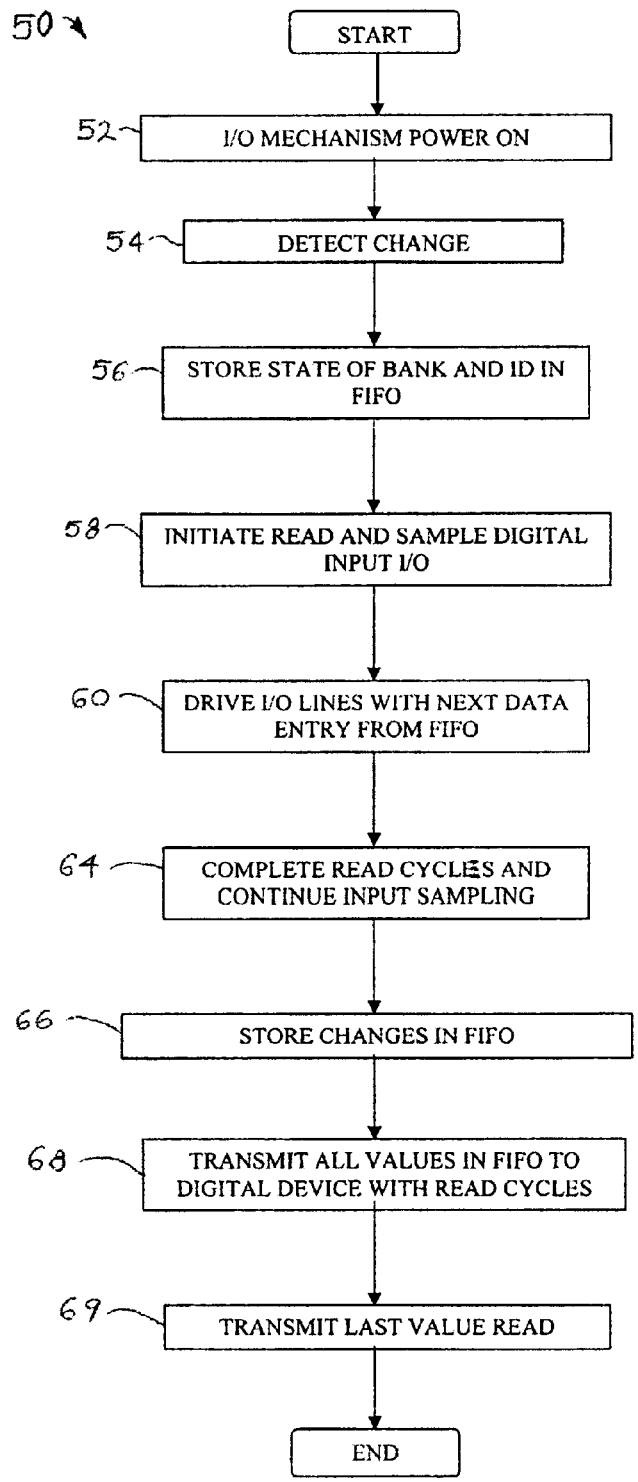
FIG. 3 is a logic flow diagram of a Multiplexed Digital Input (MDI) description in accordance with another aspect of the present invention.

In FIG. 3, a logic flow diagram 50 of a Multiplexed Digital Input (MDI) description is illustrated. Logic starts in operation block 52 where the Digital I/O Expansion Mechanism is first initialized (powered or reset), the stored value (in RAM) of each input bank is cleared.

In operation block 54, the value of each input bank is sampled and changes are detected. In operation block 56, if a change is detected, the state of the input bank data bits, along with the bank identifier, is stored in a First In First Out memory device otherwise known as a FIFO. In operation block 58, the digital input device samples the 8 Digital Device I/O lines via a READ cycle. In operation block 60, the Digital I/O Expansion Mechanism drives the I/O lines with the next data entry from the FIFO.

In operation block 64, completion of this READ cycle initiates another sampling of all digital inputs, with any detected changes stored in the FIFO in operation block 66.

In operation block 68, FIFO values are transmitted to the Digital Device. Once all values in the FIFO have been transmitted to the Digital Device during the READ cycles, in operation block 69, the value subsequently transmitted to the Digital Device will be the last value read. In this way the Digital Device knows that no new digital inputs have changed. The size of the FIFO must be selected such that it will not overflow given the worst-case rate of change of the digital inputs at the READ duty cycle of the Digital I/O Device.

Figure 4:
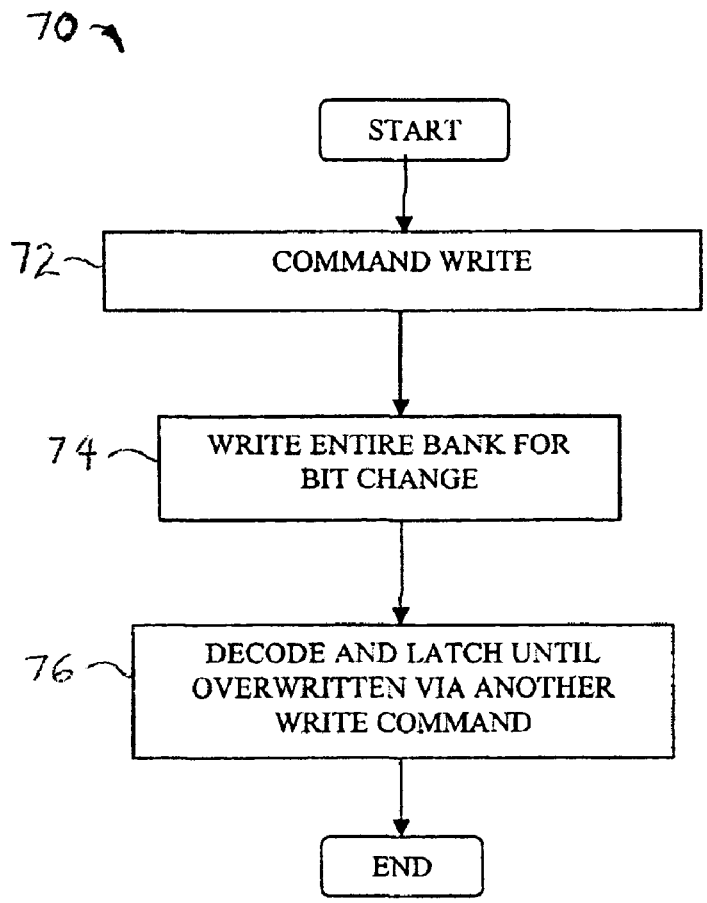
FIG. 4 is a logic flow diagram of a De-Multiplexed Digital Output (DDO) description in accordance with another aspect of the present invention.

In FIG. 4, a logic flow diagram 70 of a De-Multiplexed Digital Output (DDO) description, in accordance with another embodiment of the present invention, is illustrated. Logic starts in operation block 72, where the digital outputs are changed when a WRITE occurs and the Digital Device explicitly selects an output to be set. In operation block 74, an entire bank (i.e. all the data bits in the bank) is written for any bit change. In operation block 76, this data output value is decoded and latched until it is overwritten via another WRITE command to this bank from the Digital Device.

In operation, a method for I/O data transfer includes clearing a stored value of a first input bank and sampling a first value of the first input bank. A change is detected in the input bank. The FIFO stores a state of a data bit of the input bank and a bank identifier. An I/O line is sampled via a first READ cycle, and the I/O line is driven with a next data entry from the FIFO. Substantially all digital inputs are sampled and the FIFO stores any detected changes. All values in the FIFO are transmitted to a Digital Device during subsequent READ cycles, and a last value read is also transmitted to the Digital Device. Important to note is that alternate embodiments of the present invention require as many READs as data banks in the FIFO are filled. For example, if the FIFO has "x" data banks, then approximately "x" READs are needed to obtain all the data. A digital output is changed when a first WRITE command occurs and the Digital Device explicitly selects the digital output to be set. An entire bank is written in response to a bit change. The digital output is then decoded and latched until the digital output is overwritten via a second WRITE command to the input bank from the Digital Device. Alternate embodiments of the present invention are applicable to devices including numerous inputs and outputs, as will be understood by one skilled in the art.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

What is claimed is:

1. An I/O system comprising:
    a Digital Device; and
    a Digital I/O Expansion Mechanism, electrically coupled to said Digital Device comprising a first input bank, a FIFO, and an I/O line, said Digital I/O Expansion Mechanism adapted to clear a stored value of said first input bank, sample a first value of said first input bank, detect a change in said input bank, store a state of a data bit of said input bank in said FIFO, store a bank identifier in said FIFO, sample said I/O line via a first READ cycle, drive said I/O line with a next data entry from said FIFO, sample all digital inputs, store any detected changes in said FIFO, transmit all values in said FIFO to said Digital Device during subsequent READ cycles, transmit to said Digital Device a last value read, change a digital output when a first WRITE command occurs and said Digital Device explicitly selects said digital output to be set, write an entire bank in response to a bit change, decode said digital output, and latch said digital output until said digital output is overwritten via a second WRITE command to said input bank from said Digital Device.

2. The system of claim 1 wherein an entire bank is written for any bit change therefrom generating an output value signal.

3. The system of claim 2 further comprising a decoder adapted to decode said output value signal.

4. The system of claim 2 further comprising a latch adapted to latch said output value signal until it is overwritten via a third write command to said entire bank from said Digital Device.

5. The system of claim 1 wherein said Digital Device includes separate input and output lines.

6. The system of claim 1 wherein said Digital I/O Epansion Mechanism is further adapted to use control signals to indicate valid READ and WRITE cycles on a bi-directional data line.

7. The system of claim 1 wherein a DDO is updated when a change is detected on said digital output.

8. A method for I/O data transfer comprising:
    initializing a stored value of a first input bank;
    sampling a first value of said first input bank;
    detecting a change in said input bank;
    storing a state of a data bit of said input bank in a FIFO;
    storing a bank identifier in said FIFO;
    sampling an I/O line via a first READ cycle;
    driving said I/O line with a next data entry from said FIFO;
    sampling all digital inputs;
    storing any detected changes in said FIFO;
    transmitting all values in said FIFO to a Digital Device during a second READ cycle;
    transmitting to said Digital Device a last value read;
    changing a digital output when a WRITE occurs and said Digital Device explicitly selects said digital output to be set;
    writing an entire bank in response to a bit change;
    decoding said digital output; and
    latching said digital output until said digital output is overwritten via a third WRITE command to said input bank from said Digital Device.

9. The method of claim 8 further comprising generating a control signal to indicate valid READ and WRITE cycles on a bi-directional data line.

10. The method of claim 8 wherein a DDO is updated when a change is detected on said digital output.

11. An I/O system comprising:
    a memory including a first input bank, said memory adapted to reset and thereby clear a stored first value within said first input bank;
    a change detector adapted to sample a second value within said first input bank, said change detector further adapted to detect a first change and generate a first store signal in response thereto, said change detector further adapted to sample all Digital I/O Device inputs in response to completion of necessary READ cycles and generate therefrom a second sample signal, said change detector further adapted to detect a second change and generate a second store signal in response thereto;
    a FIFO adapted to receive said first store signal and store a first state of input bank data bit and a first bank identifier in response thereto and generate therefrom a first bank signal, said FIFO further adapted to receive said second store signal and store a second state of input bank data bit and a second bank identifier in response thereto and generate therefrom a second bank signal,
    a Digital Device adapted to sample at least one Digital Device I/O line via a READ cycle and thereby generate an I/O sample signal, said Digital Device adapted to receive all values stored in said FIFO during said READ cycle, said Digital Device further adapted to receive a last value READ from said FIFO following reception of said all values;
    an I/O Transmit and Receive Control adapted to receive said I/O sample signal and drive said Digital Device I/O line to said Digital Device with a next data entry from said FIFO in response thereto;
    a decoder adapted to decode said output value signal; and
    a latch adapted to latch said output value signal until it is overwritten via a third write command to said entire bank from said Digital Device.

12. The system of claim 11 further comprising a decoder adapted to decode said output value signal.

13. The system of claim 12 further comprising a latch adapted to latch said output value signal until it is overwritten via a third write command to said entire bank from said Digital Device.

14. The system of claim 11 wherein said Digital Device includes separate input and output lines.

15. The system of claim 11 wherein said I/O system is further adapted to generate a control signal to indicate valid READ and WRITE cycles on a bi-directional data line.

16. The system of claim 11 further comprising a remote module interfaced with said latch.

17. The system of claim 11 wherein a DDO is updated when a change is detected on said digital output.

* * * * *